United States Patent Office 2,852,354
Patented Sept. 16, 1958

2,852,354

TRIAZINE ALDEHYDE COMPOUNDS AND FUEL OIL COMPOSITIONS CONTAINING THE SAME

Elliot N. Schubert, Paul I. Du Brow, and Richard L. Betcher, Chicago, Ill., assignors to Armour and Company, Chicago, Ill., a corporation of Illinois No Drawing. Application October 3, 1955
Serial No. 538,255

12 Claims. (Cl. 44—63)

This invention relates to a new and useful class of triazine aldehyde compounds. In one of its aspects, this invention relates to improved fuel oil compositions containing these novel triazine aldehyde compounds.

The class of triazine aldehyde compounds to which this invention is directed can be designated by the following structural formula:

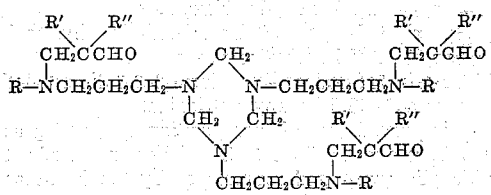

wherein R is an aliphatic hydrocarbon radical having from 8 to 22 carbon atoms and R' and R" are selected from the group consisting of hydrogen and lower alkyl radicals having from 1 to 4 carbon atoms. Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, and mixtures of hydrocarbon radicals as derived from tallow, coconut oil, soybean oil, cottonseed oil, and other animal and vegetable oils. Examples of radicals coming within the definition of R' and R" include methyl, ethyl, propyl, isopropyl, butyl, and isobutyl. In our preferred compounds, R' and R" are, in each instance, methyl radicals and R, which is also the same in each instance, is a mixture of hydrocarbon radicals derived from tallow, coconut oil or soybean oil fatty acids. Thus, one preferred compound is 1,3,5-tris[N-tallow-N(β-formyl-β,β-dimethylethyl)γ - aminopropyl]1,3,5 - hexahydrotriazine. Other preferred compounds are the corresponding coco and soya derivatives.

The triazine aldehyde compounds of the present invention can be prepared by a modified type of Mannich reaction which involves reacting a N-substituted trimethylenediamine with formaldehyde and a lower alkyl aldehyde in 1:2:1 molar proportions. In the reaction one mol of the formaldehyde reacts with the primary amine portion of the diamine to form the hexahydrotriazine and the remaining mol of formaldehyde together with the lower alkyl aldehyde react with the secondary amine portion of the trimethylene diamine to form a propionaldehyde substituent on the same. The reaction can be illustrated by the following equation in which simplified formulas are employed:

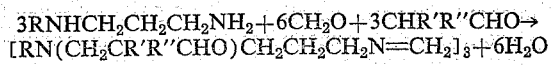

It will be understood that R, R' and R" are the same as hereinbefore defined.

The N-substituted trimethylenediamines employed as one of the starting materials are commercially available compounds. They are sold under the trade name "Duomeen" and are prepared generally by reacting long-chain primary amines with acrylonitrile followed by hydrogenation of the nitrile group to an amine.

The formaldehyde can be employed in the form of a water solution (formalin), the trimer, trioxymethylene, or the polymer paraformaldehyde.

In producing the triazine aldehyde compounds of the present invention, formaldehyde, preferably as an aqueous solution, is added over a period of about 15 to 30 minutes at a temperature in the range of 60 to 100° C. to the N-aliphatic trimethylenediamine which is preferably dissolved in a suitable solvent such as methanol, ethanol or isopropanol. The lower alkyl aldehyde is then added and the mixture refluxed with stirring for a period of about 2 hours. The reaction time will vary, generally, between about 1 and 12 hours. After cooling and settling is allowed to take place, the aqueous alcohol layer is then separated from the product layer, which is a yellowish oil, and the latter heated at reduced pressure for several hours to remove volatile impurities. The product can then be used as an additive for fuel oils.

It is well known that hydrocarbon fuel oils, such as those used in burner systems, Diesel and combustion engines and other industrial and domestic equipment, are subject to numerous shortcomings due to chemical deterioration and impurities. This is particularly true of fuel oils which contain a substantial quantity of cracked components. For example, the oils tend in the presence of water to become corrosive to metallic surfaces after short periods of storage or exposure to the atmosphere. Many oils tend to develop undesirable solids or sludge which deleteriously affect their usefulness, either by diminution of their combustive capacities or by their tendency to clog the filters present in the equipment being employed. Also, the oils tend to develop undesirable color. We have found that our triazine aldehyde compounds are effective in reducing the above mentioned shortcomings in fuel oils.

The hydrocarbon distillate fuel oils in which the triazine aldehyde compounds of the present invention are dispersed or dissolved can be treated or untreated cracked fuel oils or mixtures of cracked fuel oils with straight-run fuel oils, said fuel oils having components normally distilling from about 300° F. to about 700° F. Preferred fuel oils having a boiling range of from about 340° F. to about 700° F., and particularly from about 400° F. to about 675° F. Specifically, hydrocarbon distillates which are utilized as bases in the improved fuel oil compositions of the present invention are cracked gas oils, fuel oils, furnace oils, burner oils, diesel fuel oils, kerosene, etc., and mixtures of said cracked fuels with the corresponding or like straight-run hydrocarbon fractions.

The quantity of the triazine aldehyde compounds of the present invention which can be added to the fuel oil can vary within wide limits, depending upon the nature of the oil, especially those containing a substantial quantity of cracked components, and the use to which it is to be put. While the concentration of the added triazine aldehyde can be as low as about 25 parts per million and as high as 1 or 2 weight percent, we prefer, in the case of a domestic fuel oil containing a substantital quantity of cracked components, to add between about 50 and about 100 parts per million of additive. Our triazine aldehyde compounds are, in general, liquids and oil-soluble and can be dissolved to provide the desired concentration of additive in the resulting fuel oil.

The following examples will help to illustrate the underlying principles of our invention:

*Example I*

63 gms. or 0.2 mol of N-coco trimethylenediamine was dissolved in 200 ml. of 3A alcohol and the solution heated to about 50° C. 32.4 gms. or 0.43 mol of 40% formalin was added dropwise over a period of one hour while the mixture was mechanically stirred. 14.4 gms. or 0.2 mol of isobutyraldehyde was added to the two-phase system yielding a clear solution which was refluxed for 2 hours. The cloudy solution which resulted on cooling was stripped of alcohol and water at reduced pressure. The yellow oily liquid product had a neutral equivalent of 368 and the infra-red spectrum showed strong absorption bands at 5.9 μ and 6.1 μ indicating an aldehyde group and an imine group, respectively. Thus, the product produced was 1,3,5-tris[N-coco-N-(β-formyl-β,β-dimethylethyl)γ-aminopropyl]-1,3,5-hexahydrotriazine.

*Example II*

76 gms. or 0.2 mol of N-tallow trimethylenediamine was dissolved in 200 ml. of 3A alcohol and the solution heated to about 50° C. 32.4 gms. or 0.43 mol of 40% formalin was added with mechanical stirring over a period of 15 minutes. 14.4 gms. or 0.2 mol of isobutyraldehyde was added and the mixture refluxed for 2 hours. Upon cooling the mixture separated into two layers. The upper layer was diluted with water causing more product to separate and this product combined with the lower layer. The oily product was stripped of water and alcohol at reduced pressure. The product had a neutral equivalent of 406, and its infra-red spectrum had strong absorption bands at 5.9 μ and 6.1 μ indicating an aldehyde group and an imine group, respectively. Thus, the product produced was 1,3,5-tris[N-tallow-N-(β-formyl-β,β-dimethylethyl)γ-aminopropyl]-1,3,5-hexahydrotriazine.

*Example III*

A domestic furnace oil comprised of 100% catalytically cracked stock was used to prepare a control and two test samples containing 100 parts per million each of 1,3,5-tris[N-coco-N-(β-formyl-β,β-dimethylethyl)γ-aminopropyl]1,3,5-hexahydrotriazine and 1,3,5-tris[N-tallow-N-(β-formyl-β,β-dimethylethyl)γ-aminopropyl]-1,3-5-hexahydrotriazine. The samples were stored in vented containers protected from light at 110° F. for 13 weeks. 2% by weight of water was added to each sample before storage.

At the end of 13 weeks the amount of insoluble sludge in each of the samples was determined by filtering 400 cc. of each sample through F frit sintered glass Gooch crucibles and rinsing the crucibles and bottles free of fuel oil with mineral spirits. The crucibles and bottles were then washed again with a 50–50 mixture of acetone and methyl alcohol to dissolve the insoluble gum and this filtrate was collected in a 100 cc. tared moisture dish and the solvent evaporated. The gum plus the dry dish were dried to constant weight at 240° F. in an air-circulating oven and the weight of the gum determined.

The control contained 48.5 mgs. of insoluble sludge per liter of oil. The sample containing the coco derivative as additive contained 34.2 mgs. per liter of insoluble sludge, and the sample containing the tallow derivative as an additive contained 30.0 mgs. per liter of insoluble sludge.

Both the initial and final color of the test samples was determined with a National Petroleum Association (NPA) color wheel used in a Hellige Comparator. The initial color of each sample was one and half. The final color on the control sample was three and half while each of the test samples had a final color of less than three and half.

While this invention has been described and exemplified in terms of its preferred embodiments, those skilled in the art will appreciate that modifications can be made without departing from the spirit and scope of the invention.

We claim:

1. A triazine-aldehyde compound represented by the formula:

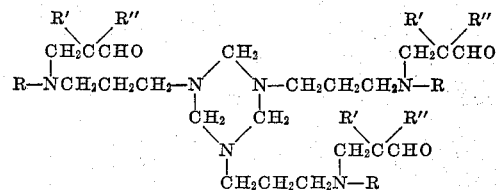

wherein R is an aliphatic hydrocarbon radical having from 8 to 22 carbon atoms and R' and R" are selected from the group consisting of hydrogen and lower alkyl radicals containing from 1 to 4 carbon atoms.

2. 1,3,5-tris [N-tallow-N(β-formyl-β,β-dimethylethyl)-γ-aminopropyl]-1,3,5-hexahydrotriazine.

3. 1,3,5-tris [N-coco-N(β-formyl-β,β-dimethylethyl)-γ-aminopropyl]-1,3,5-hexahydrotriazine.

4. 1,3,5-tris [N-soya-N(β-formyl-β,β-dimethylethyl)-γ-aminopropyl]-1,3,5-hexahydrotriazine.

5. 1,3,5-tris [N-dodecyl-N(β-formyl-β,β-dimethylethyl-γ-aminopropyl]-1,3,5-hexahydrotriazine.

6. An improved fuel oil composition containing as an additive from about 0.0025 to 2 weight percent of a triazine aldehyde compound represented by the formula:

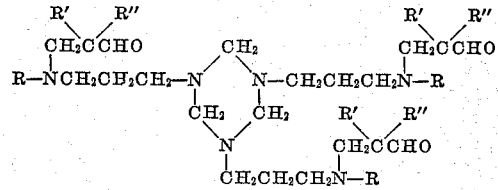

wherein R is an aliphatic hydrocarbon radical having from 8 to 22 carbon atoms and R' and R" are selected from the group consisting of hydrogen and lower alkyl radicals containing from 1 to 4 carbon atoms.

7. An improved fuel oil composition containing as an additive from about 0.0025 to 2 weight percent of 1,3,5-tris [N - tallow - N(β - formyl - β,β - dimethylethyl) - γ-aminopropyl]-1,3,5-hexahydrotriazine.

8. A domestic furnace oil having present therein a substantial quantity of cracked components containing about 50 to about 100 parts per million of a triazinealdehyde compound represented by the formula:

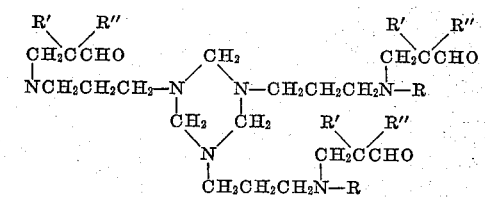

wherein R is an aliphatic hydrocarbon radical having from 8 to 22 carbon atoms and R' and R" are selected from the group consisting of hydrogen and lower alkyl radicals containing from 1 to 4 carbon atoms.

9. A domestic furnace oil having present therein a substantial quantity of cracked components containing about 50 to about 100 parts per million of 1,3,5-tris [N-tallow-N(β - formyl - β,β - dimethylethyl) - γ - aminopropyl]-1,3,5-hexahydrotriazine.

10. A domestic furnace oil having present therein a substantial quantity of cracked components containing about 50 to about 100 parts per million of 1,3,5-tris [N-soyo-N($\beta$ - formyl - $\beta,\beta$ - dimethylethyl) - $\gamma$ - aminopropyl]-1,3,5-hexahydrotriazine.

11. A domestic furnace oil having present therein a substantial quantity of cracked components containing about 50 to about 100 parts per million of 1,3,5-tris [N-coco - N($\beta$ - formyl - $\beta,\beta$-dimethylethyl)-$\gamma$-aminopropyl]-1,3,5-hexahydrotriazine.

12. A domestic furnace oil having present therein a substantial quantity of cracked components containing about 50 to about 100 parts per million of 1,3,5-tris [N-dodecyl - N($\beta$ - formyl - $\beta,\beta$ - dimethylethyl)-$\gamma$-aminopropyl]-1,3,5-hexahydrotriazine.

References Cited in the file of this patent

UNITED STATES PATENTS

| | | |
|---|---|---|
| 2,651,631 | Zerner et al. | Sept. 8, 1953 |
| 2,675,382 | Melamed | Apr. 13, 1954 |
| 2,685,581 | Coover | Aug. 3, 1954 |
| 2,701,187 | Andress | Feb. 1, 1955 |
| 2,714,057 | Chenicek | July 26, 1955 |